(12) United States Patent
Toksvig et al.

(10) Patent No.: US 8,004,522 B1
(45) Date of Patent: Aug. 23, 2011

(54) USING COVERAGE INFORMATION IN COMPUTER GRAPHICS

(75) Inventors: Michael J. M. Toksvig, Palo Alto, CA (US); Brian K. Cabral, San Jose, CA (US); Edward A. Hutchins, Mountain View, CA (US); Gary C. King, San Jose, CA (US); Christopher D. S. Donham, San Mateo, CA (US)

(73) Assignee: NVIDIA Corporation, Santa Clara, CA (US)

( * ) Notice: Subject to any disclaimer, the term of this patent is extended or adjusted under 35 U.S.C. 154(b) by 951 days.

(21) Appl. No.: 11/890,839

(22) Filed: Aug. 7, 2007

(51) Int. Cl.
*G06T 15/50* (2006.01)
*G09G 5/00* (2006.01)

(52) U.S. Cl. ........................................ 345/426; 345/581
(58) Field of Classification Search .................. None
See application file for complete search history.

(56) References Cited

U.S. PATENT DOCUMENTS

| | | | |
|---|---|---|---|
| 4,687,326 A | 8/1987 | Corby, Jr. | |
| 4,727,471 A | 2/1988 | Driels et al. | |
| 4,899,318 A | 2/1990 | Schlumberger et al. | |
| 5,038,383 A | 8/1991 | Usumoto et al. | |
| 5,386,509 A | 1/1995 | Suzuki et al. | |
| 5,438,656 A * | 8/1995 | Valdes et al. ................... | 345/443 |
| 5,442,733 A | 8/1995 | Kaufman et al. | |
| 5,487,172 A | 1/1996 | Hyatt | |
| 5,550,933 A | 8/1996 | Stetten | |
| 5,553,161 A | 9/1996 | Fischer | |
| 5,647,018 A | 7/1997 | Benjamin | |
| 5,659,671 A | 8/1997 | Tannenbaum et al. | |
| 5,774,133 A | 6/1998 | Neave et al. | |
| 5,818,456 A | 10/1998 | Cosman et al. | |
| 5,877,768 A | 3/1999 | Jain | |
| 5,880,736 A | 3/1999 | Peercy et al. | |
| 5,949,424 A | 9/1999 | Cabral et al. | |
| 6,023,279 A | 2/2000 | Sowizral et al. | |
| 6,046,744 A | 4/2000 | Hoppe | |
| 6,057,852 A | 5/2000 | Krech, Jr. | |
| 6,163,319 A | 12/2000 | Peercy et al. | |
| 6,172,679 B1 | 1/2001 | Lim | |
| 6,222,937 B1 | 4/2001 | Cohen et al. | |
| 6,226,005 B1 | 5/2001 | Laferriere | |
| 6,249,287 B1 | 6/2001 | Yamrom | |
| 6,266,064 B1 | 7/2001 | Snyder | |
| 6,292,192 B1 | 9/2001 | Moreton | |
| 6,307,555 B1 | 10/2001 | Lee | |
| 6,407,736 B1 | 6/2002 | Regan | |
| 6,426,755 B1 | 7/2002 | Deering | |
| 6,437,793 B1 * | 8/2002 | Kaasila .......................... | 345/611 |

(Continued)

OTHER PUBLICATIONS

Tomas Akenine-Moller and Eric Haines, "Real-Time Rendering", 2nd ed., 2002, A.K. Peters Ltd., pp. 92-99.*

(Continued)

*Primary Examiner* — Daniel F Hajnik

(57) ABSTRACT

The boundary of a surface can be represented as a series of line segments. A number of polygons are successively superimposed onto the surface. The polygons utilize a common reference point and each of the polygons has an edge that coincides with one of the line segments. Coverage bits are associated with respective sample locations within a pixel. A value of a coverage bit is changed each time a sample location associated with the coverage bit is covered by one of the polygons. Final values of the coverage bits are buffered after all of the polygons have been processed. The values of the coverage bits can be used when the surface is subsequently rendered.

17 Claims, 10 Drawing Sheets

U.S. PATENT DOCUMENTS

| | | |
|---|---|---|
| 6,452,595 B1 | 9/2002 | Montrym et al. |
| 6,469,707 B1 | 10/2002 | Voorhies |
| 6,587,104 B1 | 7/2003 | Hoppe |
| 6,621,925 B1 | 9/2003 | Ohmori et al. |
| 6,664,955 B1 | 12/2003 | Deering |
| 6,668,082 B1 | 12/2003 | Davison et al. |
| 6,687,396 B1 | 2/2004 | Sugiura et al. |
| 6,720,975 B1 | 4/2004 | Dietrich, Jr. |
| 6,734,861 B1 | 5/2004 | Van Dyke et al. |
| 6,828,985 B1 | 12/2004 | Long et al. |
| 6,831,658 B2 | 12/2004 | Taneja et al. |
| 6,927,781 B1 * | 8/2005 | Kong .................... 345/613 |
| 6,943,791 B2 | 9/2005 | Pascual et al. |
| 6,947,057 B2 | 9/2005 | Nelson et al. |
| 6,982,723 B1 | 1/2006 | Szymaniak |
| 6,996,505 B1 * | 2/2006 | Edelsbrunner et al. ........... 703/2 |
| 6,999,076 B2 | 2/2006 | Morein |
| 6,999,100 B1 | 2/2006 | Leather et al. |
| 7,030,878 B2 | 4/2006 | Xu et al. |
| 7,129,941 B2 | 10/2006 | Deering et al. |
| 7,333,119 B1 | 2/2008 | King et al. |
| 7,372,471 B1 | 5/2008 | Hutchins |
| 7,425,960 B2 | 9/2008 | Dowling et al. |
| 7,633,506 B1 * | 12/2009 | Leather et al. ............... 345/506 |
| 7,652,677 B2 * | 1/2010 | Dorbie et al. ................ 345/614 |
| 2002/0015041 A1 | 2/2002 | Naegle et al. |
| 2002/0054712 A1 | 5/2002 | Sun |
| 2002/0118875 A1 | 8/2002 | Wilensky |
| 2003/0183692 A1 | 10/2003 | Dickson et al. |
| 2004/0012610 A1 | 1/2004 | Taneja et al. |
| 2004/0161146 A1 | 8/2004 | Van Hook et al. |
| 2004/0174376 A1 | 9/2004 | Deering |
| 2004/0183801 A1 | 9/2004 | Deering |
| 2004/0207622 A1 | 10/2004 | Deering et al. |
| 2004/0257607 A1 | 12/2004 | Gupta et al. |
| 2005/0225554 A1 * | 10/2005 | Bastos et al. .................. 345/506 |
| 2005/0280648 A1 | 12/2005 | Wang et al. |
| 2006/0077209 A1 | 4/2006 | Bastos et al. |
| 2006/0103663 A1 | 5/2006 | Collodi |
| 2006/0170703 A1 | 8/2006 | Liao |
| 2007/0002068 A1 | 1/2007 | Whitted et al. |
| 2007/0008336 A1 | 1/2007 | Bastos et al. |
| 2007/0018988 A1 * | 1/2007 | Guthe .......................... 345/441 |
| 2007/0047790 A1 | 3/2007 | Dewaele |
| 2007/0097145 A1 | 5/2007 | Akenine-Moller |
| 2007/0165035 A1 * | 7/2007 | Duluk et al. .................. 345/506 |

OTHER PUBLICATIONS

Kilgariff et al., "The GeForce 6 Series GPU Architecture", Excerpted from GPU Gems 2, 2005 by nVidia Corporation, Chapter 30.

* cited by examiner

700

```
┌─────────────────────────────────────────────┐
│ IDENTIFY A SURFACE AND SELECT A REFERENCE VERTEX │
│                     702                      │
└─────────────────────────────────────────────┘
                      ▼
┌─────────────────────────────────────────────┐
│ REPRESENT THE SURFACE BOUNDARY AS A SERIES OF LINE │
│                  SEGMENTS                    │
│                     704                      │
└─────────────────────────────────────────────┘
                      ▼
┌─────────────────────────────────────────────┐
│ SUCCESSIVELY SUPERIMPOSE POLYGONS ONTO THE SURFACE │
│                     706                      │
└─────────────────────────────────────────────┘
                      ▼
┌─────────────────────────────────────────────┐
│   CHANGE THE VALUE OF A COVERAGE BIT EACH TIME A  │
│ SAMPLE LOCATION ASSOCIATED WITH THE BIT IS COVERED BY │
│                   A POLYGON                  │
│                     708                      │
└─────────────────────────────────────────────┘
                      ▼
┌─────────────────────────────────────────────┐
│     STORE FINAL VALUES OF THE COVERAGE BITS      │
│                     710                      │
└─────────────────────────────────────────────┘
                      ▼
┌─────────────────────────────────────────────┐
│ ACCESS THE COVERAGE INFORMATION (Bits) FOR A BOUNDING │
│                BOX OF PIXELS                 │
│                     712                      │
└─────────────────────────────────────────────┘
                      ▼
┌─────────────────────────────────────────────┐
│   USE THE COVERAGE INFORMATION TO DETERMINE WHAT  │
│  FRACTIONS OF THE PIXELS ARE COVERED BY A SURFACE │
│                     714                      │
└─────────────────────────────────────────────┘
                      ▼
┌─────────────────────────────────────────────┐
│        USE THE FRACTIONS TO SHADE THE PIXELS      │
│                     716                      │
└─────────────────────────────────────────────┘
```

FIGURE 7

USING COVERAGE INFORMATION IN COMPUTER GRAPHICS

RELATED U.S. APPLICATIONS

This Application is related to U.S. patent application Ser. No. 11/301,394 by M. Toksvig et al., filed Dec. 13, 2005, and entitled "Inside Testing for Paths Using a Derivative Mask," now U.S. Pat. No. 7,684,641, assigned to the assignee of the present invention, and hereby incorporated by reference in its entirety.

This Application is related to U.S. patent application Ser. No. 11/305,483 by M. Toksvig et al., filed Dec. 15, 2005, and entitled "Inside Testing for Paths," now U.S. Pat. No. 7,408,553, assigned to the assignee of the present invention, and hereby incorporated by reference in its entirety.

This Application is related to U.S. patent application Ser. No. 11/643,185 by C. Donham et al., filed Dec. 20, 2006, and entitled "Selecting Real Sample Locations for Ownership of Virtual Sample Locations in a Computer Graphics System," now U.S. Pat. No. 7,817,165, assigned to the assignee of the present invention, and hereby incorporated by reference in its entirety.

This Application is related to U.S. patent application Ser. No. 11/643,545 by E. Hutchins et al., filed Dec. 20, 2006, and entitled "Writing Coverage Information to a Framebuffer in a Computer Graphics System," assigned to the assignee of the present invention, and hereby incorporated by reference in its entirety.

This Application is related to U.S. patent application Ser. No. 11/643,558 by C. Donham et al., filed Dec. 20, 2006, and entitled "A Shader that Conditionally Updates a Framebuffer in a Computer Graphics System," assigned to the assignee of the present invention, and hereby incorporated by reference in its entirety.

FIELD OF THE INVENTION

Embodiments of the present invention generally relate to data processing. More specifically, embodiments of the present invention relate to computer graphics systems and graphics applications.

BACKGROUND ART

In computer graphics, it is often necessary to render (e.g., shade) an irregularly shaped surface—that is, a surface that is not a regular geometric shape, or that has edges that curve in different directions and/or have different radii of curvature. Various techniques may be used to render such surfaces. In some of these techniques, a per-pixel mask representative of the surface is generated. For example, pixels that are covered by the surface are designated as such by setting a bit per pixel, while the bit is not set for pixels that are not covered by the surface.

SUMMARY OF THE INVENTION

While a mask may be useful for shading irregularly shaped surfaces, the granularity of the mask is at the pixel level. This can result in visual artifacts (referred to as aliasing), such as stair-stepping of the surface's edges. Accordingly, an effective but computationally efficient system or method that can increase the granularity at which irregularly shaped surfaces can be rendered would be advantageous. Embodiments in accordance with the present invention provide these and other advantages.

The boundary of a surface can be represented as a series of line segments. A number of polygons (e.g., triangles) are successively superimposed onto the surface. The polygons utilize a common reference point (that is, each of the polygons has a vertex that coincides with the reference point) and each of the polygons has an edge that coincides with one of the line segments. A value of a coverage bit is changed each time a sample location associated with the coverage bit is covered by one of the polygons. Final values of the coverage bits are buffered after all of the polygons have been processed. The values of the coverage bits can be used when the surface is subsequently rendered (e.g., shaded).

In one such embodiment, there are five (5) sample locations—and therefore 5 coverage bits—associated with each pixel. The 5 coverage bits can be used to determine what fraction of the associated pixel is covered by the surface. A pixel at the edge of the surface can be shaded based on the fraction of the pixel covered by the surface.

In one embodiment, the stencil buffer, which normally holds an eight-bit stencil value per pixel, is used to store the 5 coverage bits per pixel. Because 5 bits per pixel are used instead of one bit per pixel, and because the stencil buffer can be used to store those bits, higher quality anti-aliasing can be achieved in existing hardware and without increasing storage and bandwidth requirements. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 7 is a flowchart of a computer graphics method in an embodiment according to the present invention.

DETAILED DESCRIPTION OF THE INVENTION

Figure 1:
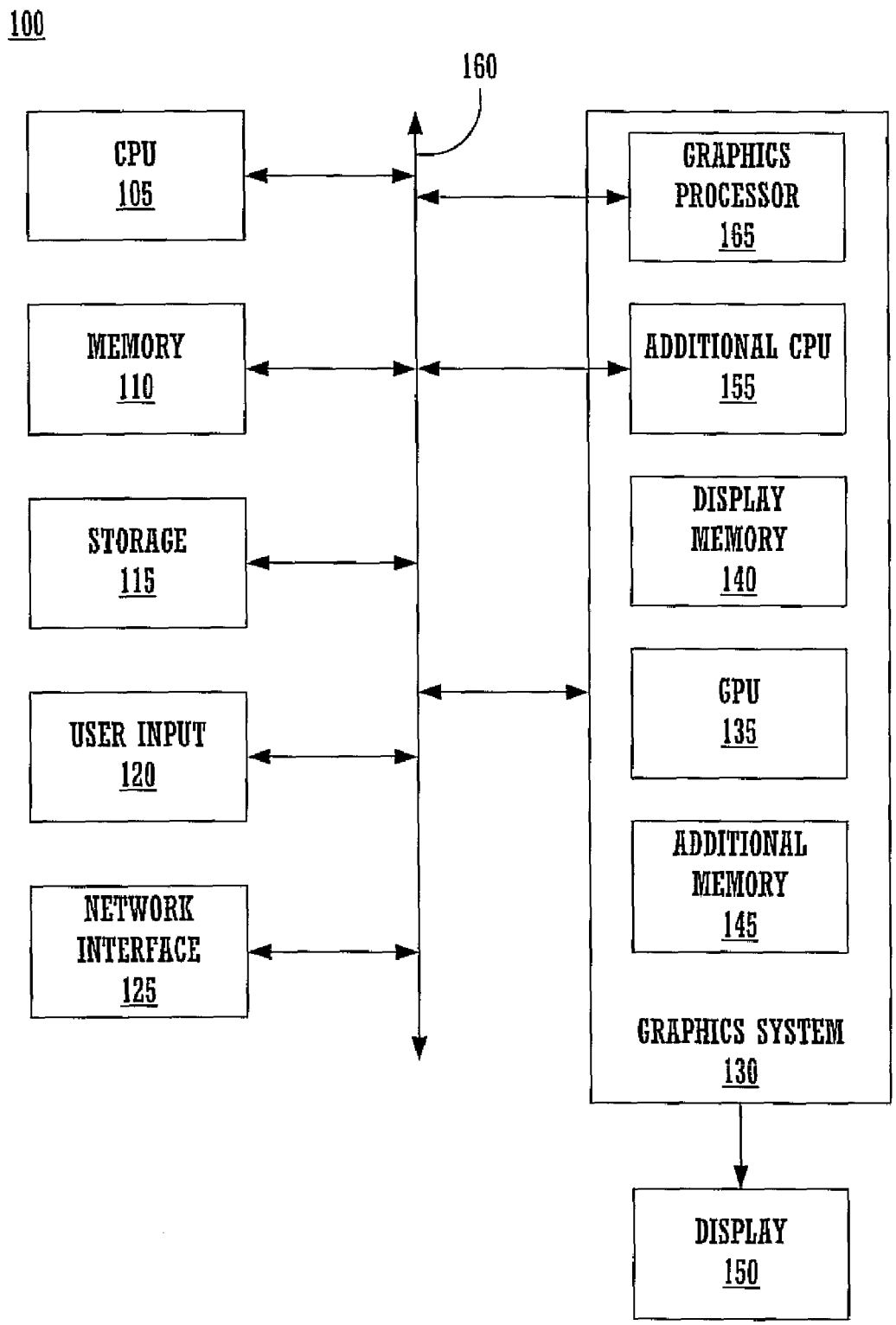
FIG. 1 is a block diagram of an exemplary computer system upon which embodiments in accordance with the present invention can be implemented.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "representing," "superimposing," "using," "changing," "storing," "rendering," "determining," "reading," "writing," "combining," "generating," "receiving," "setting," "accessing," "selecting," "producing" or the like, refer to actions and processes (e.g., flowchart 700 of FIG. 7) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

FIG. 1 is a block diagram of an example of a computer system 100, such as a personal computer (desktop, laptop, notebook), video game console, personal digital assistant, cellular phone, computer-based simulator, digital camera, or other digital device, on which embodiments of the present invention can be implemented.

In the example of FIG. 1, the computer system includes a central processing unit (CPU) 105 for running software applications and optionally an operating system. The memory 110 stores applications and data for use by the CPU. The storage 115 provides non-volatile storage for applications and data and may include fixed disk drives, removable disk drives, flash memory devices, and CD-ROM, DVD-ROM or other optical storage devices. The user input 120 includes devices that communicate user inputs from one or more users to the computer system and may include keyboards, mice, joysticks, touch screens, and/or microphones. The network interface 125 allows the computer system to communicate with other computer systems via an electronic communications network, including wired and/or wireless communication. The components of computer system, including the CPU, memory, data storage, user input devices, and network interface, are connected via one or more data buses 160.

In the present embodiment, a graphics system 130 is connected with the data bus and the components of the computer system. The graphics system may be integrated with the computer system motherboard or on a separate circuit board fixedly or removably connected with the computer system. The graphics system may include a graphics processing unit (GPU) 135 and graphics memory. The graphics memory may include a display memory 140 (e.g., a framebuffer) used for storing pixel data for each pixel of an output image. In another embodiment, the display memory and/or additional memory 145 are part of the memory 110 and are shared with the CPU 105. Alternatively, the display memory and/or additional memory can be one or more separate memories provided for the exclusive use of the graphics system.

Pixel data can be provided to the display memory directly from the CPU. Alternatively, the CPU can provide the GPU with data and/or commands defining the desired output images, from which the GPU can generate the pixel data of one or more output images. The data and/or commands defining the desired output images can be stored in the additional memory 145. In one embodiment, the GPU can generate pixel data for output images from rendering commands and data defining the geometry, lighting, shading, texturing, motion, and/or camera parameters for a scene to be rendered.

The graphics system periodically outputs pixel data for an image from the display memory for display on the display device 150. The display device is any device capable of displaying visual information in response to a signal from the computer system. The computer system can provide the display device with an analog or digital signal.

In another embodiment, the graphics processing system includes one or more additional GPUs 155, similar to GPU 135. In yet another embodiment, the graphics processing system includes a graphics coprocessor 165. The graphics coprocessor and additional GPU 155 are adapted to operate in parallel with the GPU 135 or in place of the GPU 135. The additional GPU 155 generates pixel data for output images from rendering commands, similar to the GPU 135. The additional GPU 155 can operate in conjunction with the GPU 135 to simultaneously generate pixel data for different portions of an output image, or to simultaneously generate pixel data for different output images. In one embodiment, the graphics coprocessor performs rendering related tasks such as geometry transformation, shader computations, and backface culling operations for the GPU 135 and/or additional GPUs 155.

The additional GPU 155 can be located on the same circuit board as the GPU 135, sharing a connection with the GPU 135 to the data bus, or the additional GPU 155 can be located on an additional circuit board separately connected with the data bus. The additional GPU 155 can also be integrated into the same module or chip package as the GPU 135. The additional GPU 155 can have its own display and additional memory, similar to the display memory 140 and the additional memory 145, or can share the memories 140 and 145 with the GPU 135. In one embodiment, the graphics coprocessor is integrated with the computer system chipset (not shown), such as the Northbridge or Southbridge chip used to control the data bus.

Figure 2:
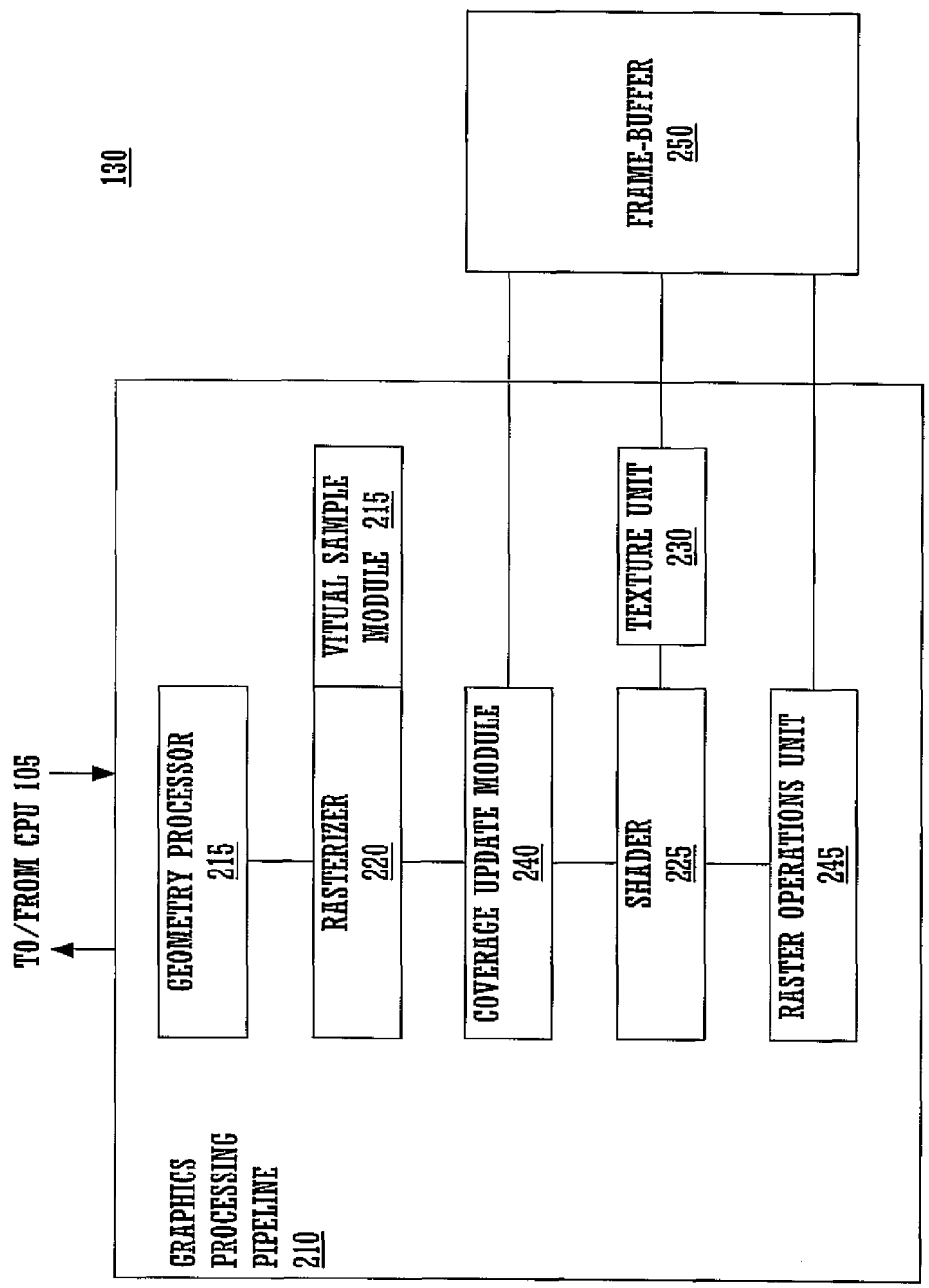
FIG. 2 is a block diagram of an example computer graphics system upon which embodiments in accordance with the present invention can be implemented.

FIG. 2 illustrates an example of a graphics system 130 in accordance with one embodiment of the present invention. A graphics processing pipeline 210 receives commands for generating graphical images from CPU 105. There may be more than one graphics processing pipeline, operating in parallel. The graphics processing pipeline may be disposed on a GPU (e.g., GPU 135 or GPU 155 of FIG. 1) and includes, for example, a geometry processor 215, a rasterizer 220, a shader unit 225 and a texture unit 230, and a raster operations (ROP) unit 245. The framebuffer 250 may include one or more buffers (not shown in FIG. 2), such as a stencil buffer, an anti-aliasing buffer, a depth buffer, and/or an alpha buffer.

In general, the geometry processor generates primitives from vertex data. In one embodiment, the geometry processor receives rendering commands and data used to define the desired rendered image or images, including geometry, lighting, shading, texturing, motion, and/or camera parameters for a scene. The rendering data may include one or more vertices defining geometric primitives. Each vertex has a position that is typically expressed in a two-dimensional or three-dimensional coordinate system. In addition to a position, various attributes are associated with each vertex. In general, attributes of a vertex may include any property that is specified on a per-vertex basis. In one embodiment, the vertex attributes include scalar or vector attributes used to determine qualities such as the color, transparency, lighting, shading, and animation of the vertex and its associated geometric primitives.

In one embodiment, the geometry processor executes one or more vertex programs on each vertex to create a transformed vertex. The geometry processor is programmable, and rendering applications can specify the vertex program to be used for any given set of vertices. In one embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations. In one embodiment, the geometry processor also culls or discards geometric primitives and/or portions thereof that are outside the field of view or otherwise unseen in the rendered image, and also may assemble one or more vertices into a geometric primitive, such as a triangle or quadrilateral.

In general, the rasterizer rasterizes primitives. In one embodiment, the rasterizer converts each geometric primitive into one or more pixel fragments. A pixel fragment defines a set of one or more pixels to be potentially displayed in the rendered image. In one implementation, a fragment comprises a two-pixel-by-two-pixel (2×2) array, referred to herein as a quad. In alternate implementations, fragments can include any other arrangement of fragments and pixels. Each fragment coming out of the rasterizer includes information defining the potential coverage of the associated geometric primitive in the rendered image, for example image coordinates of the pixels associated with the fragment and coverage of the associated geometric primitive at that pixel location.

In one embodiment, the shader uses the position information generated by the rasterizer and associated with each pixel fragment, as well as per-vertex and per-geometric primitive attributes, to determine the output values (for example, color and depth) of each fragment. A shader program is executed on each pixel fragment to determine an output color value for a pixel. In the present embodiment, the texture unit fetches a texture (specifically, a texel), and maps the texture to a pixel location in an image.

The shaded fragments are then output to the raster operations unit, along with attributes such as fragment color, depth, and stencil values. The raster operations unit integrates the fragments that are output from the shader with the portion of the rendered image already stored in the framebuffer. Fragments can be blended or masked with pixels previously written to the rendered image in the framebuffer. Raster operations can also include anti-aliasing and discarding of occluded primitives. The combination of each incoming fragment and any previously stored pixel values in the framebuffer is then output to the framebuffer as part of the rendered image.

In a coverage sampling anti-aliasing (CSAA) embodiment, the graphics system includes a virtual sample module 260 to calculate the fractional coverage of pixels that are overlapped, at least in part, by a primitive. CSAA may also be referred to as virtual coverage anti-aliasing (VCAA); for simplicity of discussion, CSAA is used herein. In one such embodiment, the virtual sample module generates the primitive coverage at virtual sample locations (see FIG. 3). The virtual samples that are generated may be stored in one or more locations, such as in a framebuffer, color buffer, z-buffer, or another memory location. In one embodiment, a coverage update unit 240 reads the current coverage from the frame buffer, updates the coverage based on the coverage of the real and virtual samples, and writes the resulting coverage to the framebuffer. Although the coverage update module and virtual sample module are illustrated at a particular location within the graphics pipeline, they may be located elsewhere, such as in the ROP 245.

Figure 3:
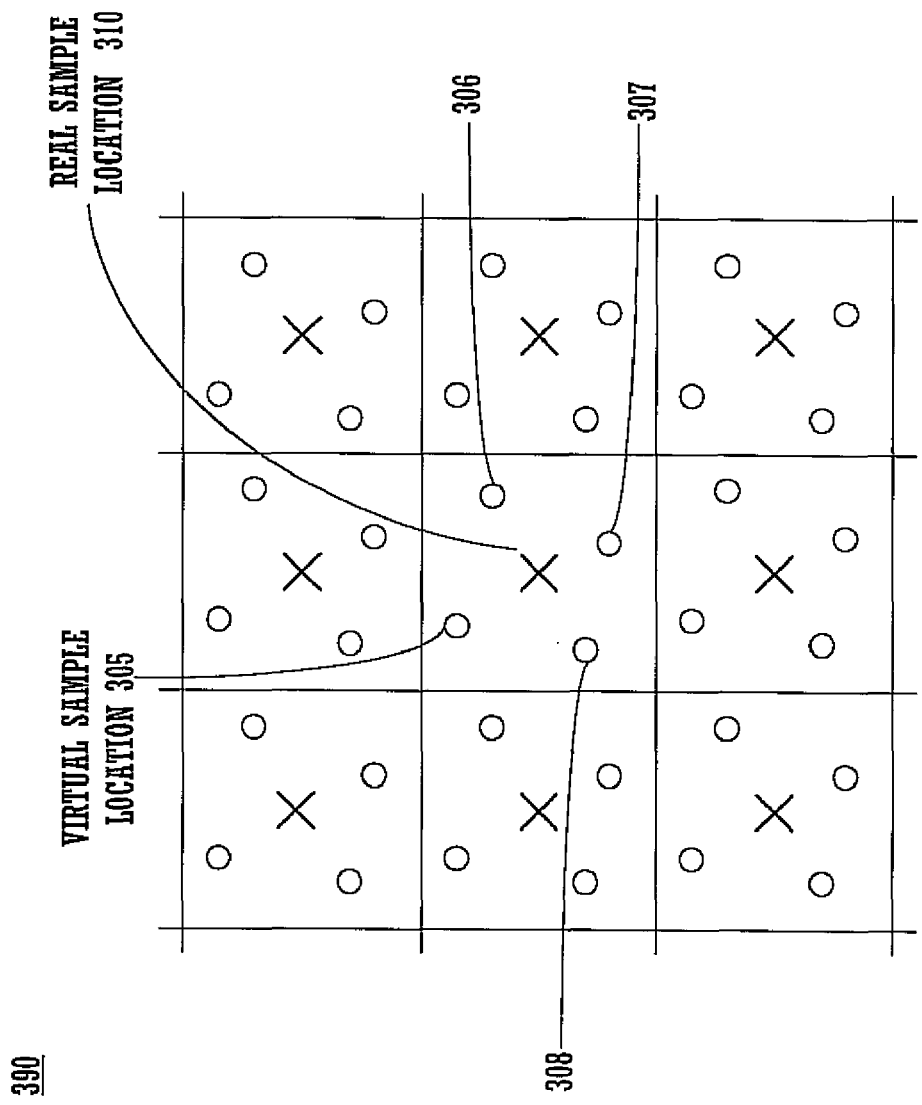
FIG. 3 illustrates pixels that include multiple sample locations in an embodiment according to the present invention.

FIG. 3 illustrates an array 390 of pixels that include real and virtual sample locations according to an embodiment of the present invention. In the present embodiment, using a pixel 300 as an example, each pixel includes a single real sample location 310 and four virtual sample locations 305, 306, 307 and 308 (305-308). Other numbers of virtual sample locations may be utilized, such as two (2) or eight (8) virtual sample locations.

A bit, referred to herein as a coverage bit, is associated with each of the sample locations. Thus, in the example of FIG. 3, there are 5 coverage bits per pixel. The values of the coverage bits can be stored per pixel in memory such as the framebuffer. In one embodiment, the values of the coverage bits are stored per pixel in the stencil buffer.

From this point forward, virtual sample locations and real sample locations are simply referred to as sample locations. The distinction between real and virtual sample locations is relevant to situations in which CSAA is enabled. However, according to embodiments of the present invention described herein, pixels covered by a surface are tested to determine how much of each of those pixels is covered by the surface. During this testing, CSAA is temporarily disabled, and so the distinction between real and virtual sample locations is less important.

In the present embodiment, the sample location 310 is in the center of the pixel 300, and the sample locations 305-308 are distributed through the interior of the pixel. In one embodiment, the sample locations 305-308 are arranged along the edges of the pixel, but not necessarily at a point that corresponds to the midpoint of the edges of the pixel. In the example of FIG. 3, the sample location 305 is located to the left of the midpoint of its corresponding edge, the sample location 306 is above the midpoint of its corresponding edge, the sample location 307 is to the right of the midpoint of its corresponding edge, and the sample location 308 is below the midpoint of its corresponding edge.

Figure 4A:
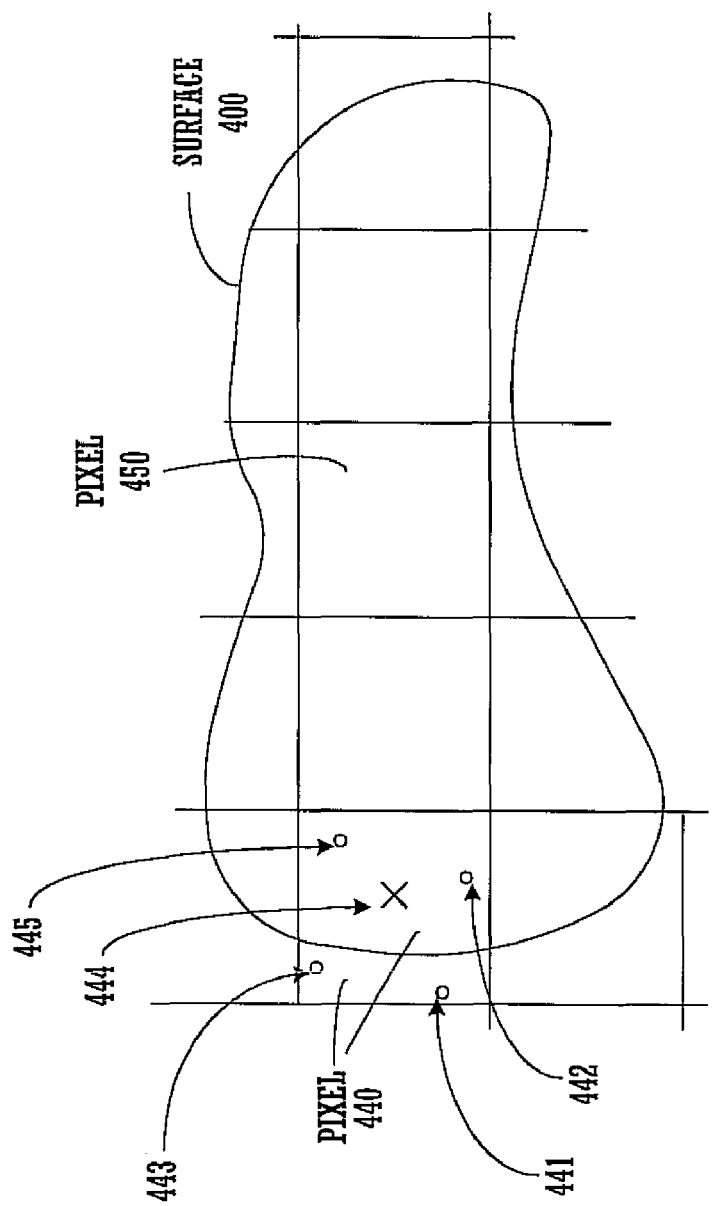
FIG. 4A illustrates a surface that overlaps a number of pixels that include multiple sample locations in an embodiment according to the present invention.

FIG. 4A illustrates a two-dimensional surface 400. Generally speaking, the boundary of the surface can have any shape.

The boundary of the surface is sometimes referred to as a path. Generally speaking, the path is closed and it may intersect itself (e.g., like a FIG. 8).

In the example of FIG. 4A, the surface overlaps a subset of pixels, including pixels 440 and 450. The surface overlaps only a part of the pixel 440, covering the sample locations 442, 444 and 445, while the sample locations 441 and 443 are not covered by the surface. The pixel 450 is covered in its entirety by the surface. The pixels and sample locations are not shown in FIGS. 4B, 4C and 4D, for clarity of illustration.

Figure 4B:
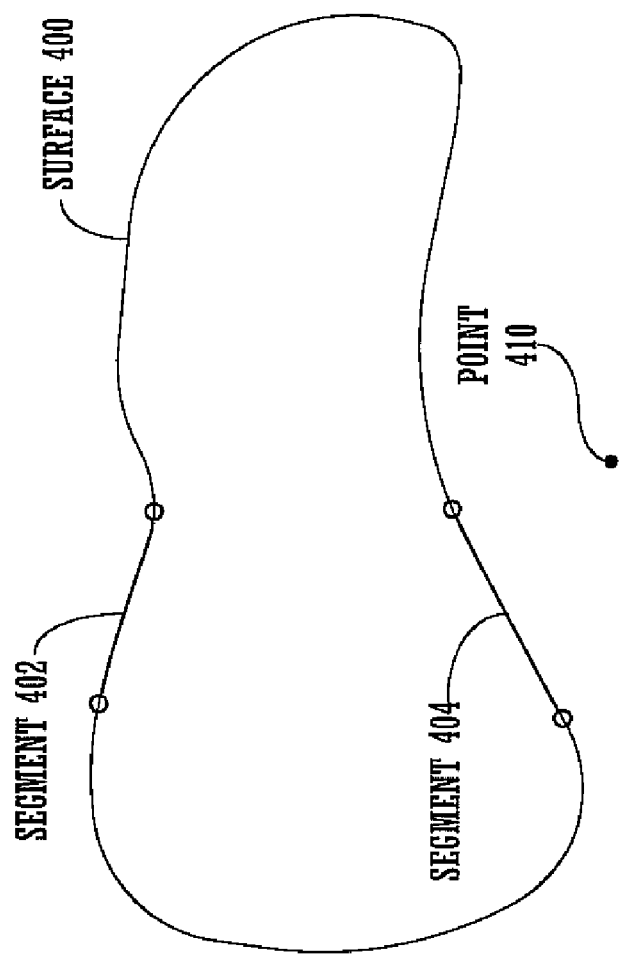
FIG. 4B illustrates a surface represented as a series of line segments in an embodiment according to the present invention.

As shown in FIG. 4B, the surface, though having curved edges, can be represented as a series of straight line segments, such as segments 402 and 404. Also shown is a reference point 410 (which may also be referred to as a reference location or a reference vertex) lying outside of the surface. The reference point may instead lie on the boundary of the surface or inside of the surface. That is, in general, the reference point can be inside, outside or on the shape being rendered. In addition, if two or more shapes are being rendered, a different reference point can be used for each shape.

Figure 4C:
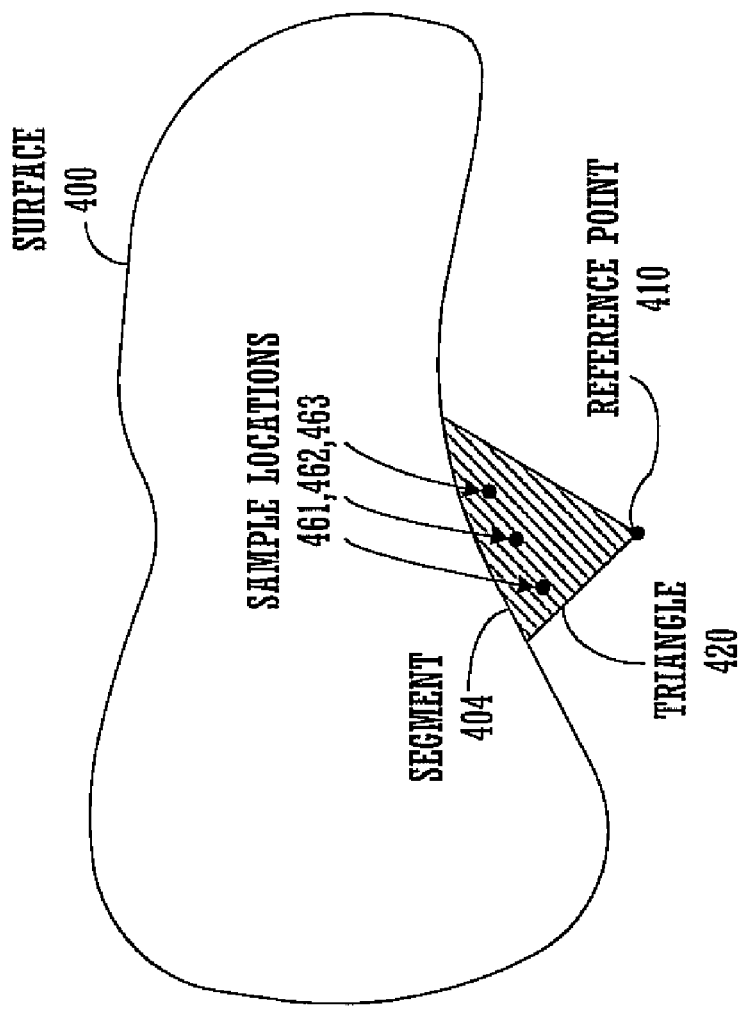
FIG. 4C illustrates a first triangle superimposed onto a surface in an embodiment according to the present invention.

As shown in FIG. 4C, a triangle 420 can be generated by connecting the reference point to the endpoints of the segment 404. Although a triangle is used in the examples described herein, in general any polygon—specifically, any convex polygon—can be used.

As noted above, a coverage bit is associated with each sample location. According to embodiments of the present invention, the values of the coverage bits associated with sample locations that lie within the boundary of the triangle 420 are set (e.g., to a binary value of one), while the values of the coverage bits associated with sample locations that lie outside the boundary of the triangle 420 are not set.

In one embodiment, the current values of the coverage bits are combined with their previous values using a logical operation (e.g., an XOR operation)—the result is then written back to memory, in place of the previous values stored there. For example, presume three (3) sample locations 461, 462 and 463 are covered by the triangle 420 (the 3 sample locations may lie within the same pixel, or they may lie in different pixels). If no triangles have been generated before the triangle 420, or if the 3 sample locations 461-463 have not been covered by a preceding triangle, then the coverage bit associated with each of the 3 sample locations would still have its initial value of binary zero (0). Once the 3 sample locations 461-463 are covered by the triangle 420, their associated coverage bits are each set to a value of binary one (1). The previous values (0,0,0) of the coverage bits are retrieved from memory and logically combined (e.g., using an XOR operation) with their current values (1,1,1), yielding a result (also 1,1,1, in this case) that is written back to memory in place of the previous values. More specifically, the bit sequence 000 and the bit sequence 111 are used as operands in a logical operation, and the resulting bit sequence 111 is written back to memory.

Figure 4D:
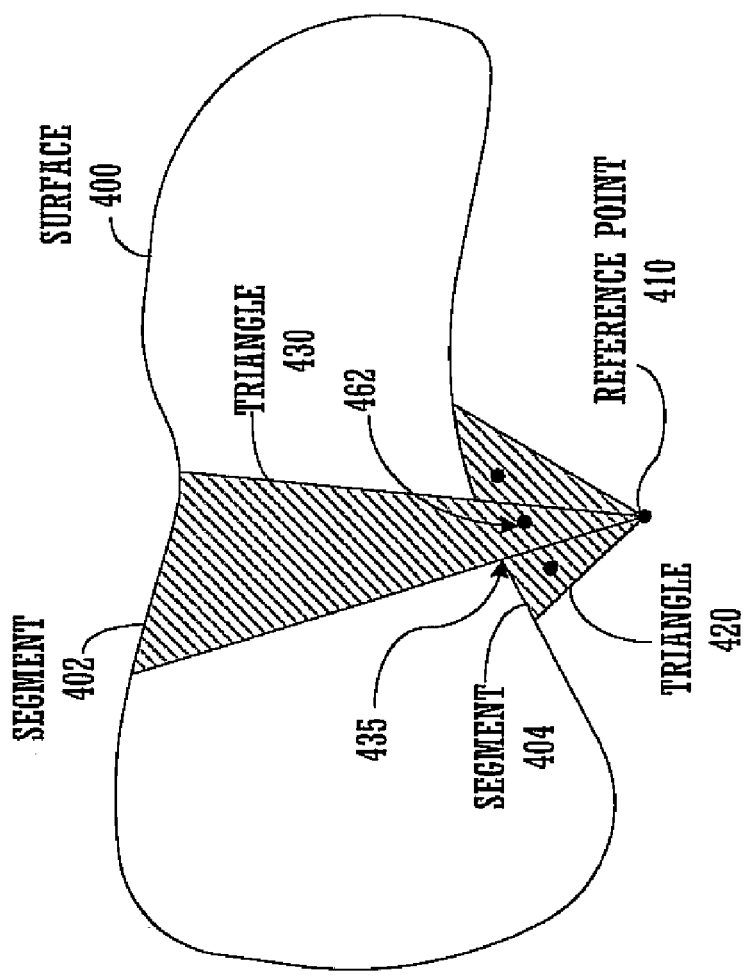
FIG. 4D illustrates a second triangle superimposed onto a surface in an embodiment according to the present invention.

As shown in FIG. 4D, a second triangle 430 is generated by connecting the reference point to the endpoints of the segment 402. In this example, the triangle 430 overlaps a portion 435 of the triangle 420. As described above, the values of the coverage bits associated with the sample locations that lie within the boundary of the second triangle 430 are set (e.g., to a binary value of 1), the current values of the coverage bits are combined with their previous values using a logical operation (e.g., an XOR operation), and the result is then written back to memory in place of the previous values stored there.

For example, presume that one of the 3 aforementioned sample locations (e.g., sample location 462) is covered by the portion 435 (the portion overlapped by the first triangle 420 and the next triangle 430), while the other two sample locations 461 and 463 lie outside of the portion 435. As described above, because the sample location 462 in the portion 435 was covered by the first triangle 420, a value of 1 was stored in memory for the coverage bit associated with that sample location. Because the sample location 462 is now also covered by the second triangle 430, the associated coverage bit has a current value of 1. The previous value (1) is retrieved from memory and logically combined (e.g., using an XOR operation) with the current value (1), yielding a result (0) that is written back to memory in place of the previous value.

The process just described is repeated for each possible triangle that can be generated using a common vertex (e.g., the reference point 410) and each of the line segments representing the surface. The line segments can be considered in any order—that is, it does not matter in what order the triangles are generated. In general, as each triangle is generated, the current values of the coverage bits associated with the sample locations covered by the triangle are set (e.g., to 1), previous values of those sample locations are read from memory, and the current values and the previous values are used as operands in a logical operation such as an XOR operation. The result of the logical operation is read back to memory in place of the previous values. In essence, each time a sample location is covered by a triangle, the coverage bit associated with that sample location is flipped from one binary value to another.

Once all of the possible triangles have been generated, the values of the coverage bits associated with sample locations covered by the surface will have a value of 1, while the coverage bits associated with sample locations not covered by the surface will have a value of 0. In this manner, a mask representing the surface is generated.

Instead of using an XOR operation, other types of logical operations can be used. For example, an OR operation or a NOR operation can be used. In contrast to the examples above, the coverage bits associated with the sample locations covered by the surface may have a value of 0 (instead of 1) while the coverage bits associated with sample locations not covered by the surface may have a value of 1 (instead of 0). In general, coverage bits associated with sample locations covered by the surface will have a first binary value, and coverage bits associated with sample locations not covered by the surface will have a different binary value.

Figure 5:
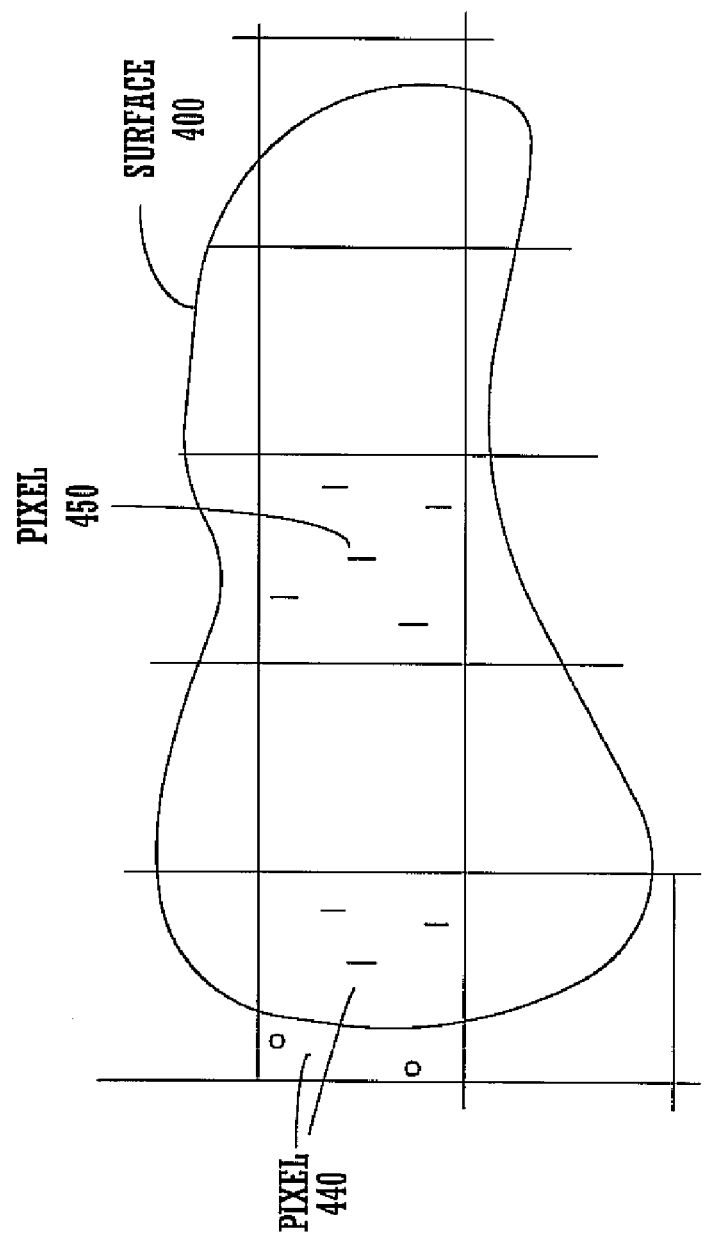
FIG. 5 illustrates multiple coverage bits per pixel in an embodiment according to the present invention.

FIG. 5 illustrates the values of the coverage bits associated with the sample locations in the pixels 440 and 450, after completion of the testing described in conjunction with FIGS. 4A-4D. In one embodiment, the values of the coverage bits are stored in the stencil buffer. Typically, the stencil buffer stores an 8-bit stencil value per pixel. Instead, during the processing described above in conjunction with FIGS. 4A-4D, the stencil buffer is used to store 5 coverage bits per pixel.

According to the example of FIG. 5, the coverage bits associated with the pixel 440 have values of 0,0,1,1,1 (in no particular order), because two of the sample locations in the pixel 440 are not covered by the surface while three of the sample locations in the pixel 450 are covered by the surface. The coverage bits associated with the pixel 450 have values of 1,1,1,1,1, because all of the sample locations in the pixel 450 are covered by the surface. The values of the coverage bits associated with a pixel can be used to approximate the fraction of that pixel that is covered by the surface. More specifically, the number of configuration bits that have a value of 1 can be divided by the total number of configuration bits to approximate how much of a pixel is covered by a surface. Thus, in the example of FIG. 5, the fraction of the pixel 440 covered by the surface is approximated as three-fifths, while the fraction of the pixel 450 covered by the surface is 1.0. Alternatively, a fractional value more easily represented in binary can be arbitrarily assigned to a pixel depending on how many of its configuration bits are set to a value of 1. Also, the individual sample locations can be weighted differently, depending on, for example, their distance from the center of the surface (or how close they are to its edges); other weighting schemes may be employed.

The fraction of a pixel that is covered by a surface (the coverage fraction) can be used to determine the color of that pixel. More specifically, the coverage fraction can be used to weight a destination color and a source color to determine a pixel color dst', as follows:

$$dst' = f \cdot src + (1-f) \cdot dst;$$

where f is the coverage fraction for a pixel, src is the source color (e.g., the color associated with the surface), and dst is the destination color (e.g., the color associated with the area adjacent to the surface).

If the coverage fraction of a pixel is zero, the pixel's color is the same as the destination color (dst'=dst). When all of a pixel's coverage bits are 0, then it is not necessary to compute the value of the coverage fraction for that pixel. Accordingly, when the shader 225 (FIG. 2) detects a pixel in which all of the coverage bits are 0, no further shading computation is required. In one embodiment, the rasterizer 220 (FIG. 2) tracks those pixels that are covered by the surface, allowing the shader to skip uncovered pixels and move directly to pixels that are covered, in whole or in part, by the surface.

Although the examples above refer to the processing of pixels, recall that, in one embodiment, a 2×2 array of pixels (a quad) is processed. Thus, in the examples above, four pixels—or 20 sample locations—can be processed per clock cycle. Also, although 5 coverage bits are described in the examples above, some number of coverage bits other than 5 (e.g., 2 or 8) can be used. In general, according to embodiments of the present invention, multiple coverage bits are used per pixel instead of only a single bit per pixel. Consequently, higher quality anti-aliasing can be achieved. Because the coverage bits can be stored in the stencil buffer in lieu of an 8-bit stencil value, existing hardware can be used, and storage and bandwidth requirements are not increased.

In the examples above, the value of a coverage bit associated with a sample location is, in essence, flipped from one binary value to another each time the sample location is covered by a triangle. Instead of flipping bit values, multiple coverage bits per sample location can be used, and the value (count) of the coverage bits can be incremented each time its associated sample location is covered by a triangle. In such an approach, non-zero values, for example, could be associated with sample locations covered by a surface and zero values could be associated with sample locations not covered by a surface. Other types of approaches can be used to create a mask that represents a surface. However, by flipping bit values in the manner described herein, only a single bit needs to be stored per sample location.

Figure 6:
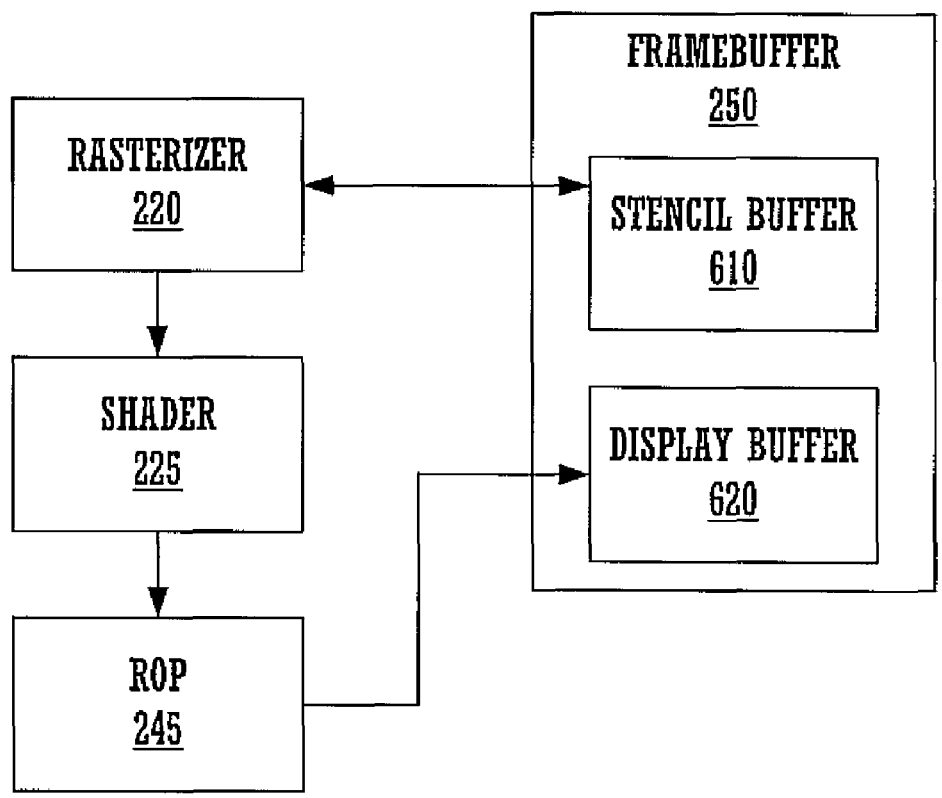
FIG. 6 is a block diagram showing a portion of a computer graphics system in an embodiment according to the present invention.

FIG. 6 is a block diagram showing a rasterizer 220, a shader 225 and a framebuffer 250 in an embodiment of the present invention. In such an embodiment, when determining the values of the coverage bits as described above, the pixel shader is disabled—data is not sent from the rasterizer to the shader. Furthermore, CSAA is disabled—data is not sent to a CSAA buffer (not shown). Coverage information is instead sent to the stencil buffer 610. After coverage information is determined for a bounding box of pixels (e.g., a frame or full screen of pixels), the shader is enabled and CSAA may also be enabled. The shader can use the coverage information contained in the stencil buffer to render (color) the pixels, and the rendered pixels are sent to the display buffer 620. In essence, a mask is produced, and the mask is used to apply colors to the pixels.

FIG. 7 is a flowchart 700 of an example of a computer graphics method according to an embodiment of the present invention. In one embodiment, the flowchart is performed by the graphics system 130 of FIG. 2. Blocks 702, 704, 706, 708 and 710 may be performed by the rasterizer 220, and blocks 712, 714 and 716 may be performed by the shader 225.

As mentioned above, each pixel is associated with a number of coverage bits, and each of the coverage bits is associated with a respective sample location within a pixel.

In block 702, a surface to be rendered is identified. Furthermore, a reference point (or reference vertex or reference location) is selected. As described previously herein, the reference point can be inside, outside or on the boundary of the surface. If outside the boundary of the surface, the reference point may be located relatively close to the surface, although this does not have to be the case.

In block 704, the boundary of the surface is represented as a series of straight line segments.

In block 706, convex polygons (e.g., triangles) are successively superimposed onto the surface. The polygons have a vertex in common—specifically, the reference point selected above is used as the vertex in common. Each of the polygons has an edge that coincides with one of the line segments.

In block 708, a value of a coverage bit is changed each time a sample location associated with the coverage bit is covered by one of the polygons. Although a single coverage bit is referred to in this block, it is understood that in actual operation there may be multiple sample locations covered by each polygon, and if so each of the coverage bits associated with those sample locations is changed.

In one embodiment, a first value for the coverage bit associated with a sample location is read from a buffer. A determination is made as to whether the sample location is covered by one of the polygons. A second value associated with the sample location is set depending on whether or not the sample location is covered by the polygon—that is, the second value has one value if the sample location is covered and another value if it is not. The first value is combined with the second value to produce a third value. In one such embodiment, the first and second values are used as operands in a logical operation (e.g., an XOR, OR or NOR operation). The third value is written to the buffer in place of the first value. In actual operation, the approach just described is performed for multiple coverage bits in parallel.

In block 710, final values of the coverage bits are stored after all of the polygons are successively superimposed.

If there are multiple shapes being rendered, the steps above can be repeated for each shape.

In block 712, coverage information is received for a bounding box of pixels. The coverage information includes a number of bits per pixel (e.g., 5 bits per pixel). The coverage information can be used to identify a subset of the pixels that are covered at least partially by a surface. The rasterizer can track those pixels that are at least partially covered by the surface, and the tracking information may also be included in the coverage information.

In block 714, for each pixel in the subset, the coverage information is used to determine what fraction of the pixel is covered by the surface.

In block 716, the coverage fractions are used to determine the colors of the pixels in the subset. More specifically, the fractions are used to weight destination colors and source colors in order to determine the colors of the pixels.

Although specific steps are disclosed in the flowchart of FIG. 7, such steps are exemplary. That is, embodiments of the present invention are well-suited to performing various other steps or variations of the steps recited in the flowchart. The steps in the flowchart may be performed in an order different than presented. Furthermore, the features of the various embodiments described above can be used alone or in combination.

In summary, according to embodiments described herein, a mask that can be used for shading irregularly shaped surfaces is produced. The granularity of the mask is increased from one bit per pixel to multiple bits per pixel. Accordingly, higher quality anti-aliasing can be achieved but without increasing storage and bandwidth requirements. As such, embodiments in accordance with the present invention provide effective but computationally efficient computer graphics systems and methods.

Embodiments of the present invention are thus described. While the present invention has been described in particular embodiments, it should be appreciated that the present invention should not be construed as limited by such embodiments, but rather construed according to the below claims.

What is claimed is:

1. A computer-implemented graphics method comprising:
identifying a reference vertex;
representing the boundary of a surface as a plurality of straight line segments;
successively superimposing a plurality of polygons onto the surface, each of the polygons having a vertex that coincides with the reference vertex and each of the polygons having an edge that coincides with one of the line segments;
changing, using a rasterizer, a value of a coverage bit for a pixel each time a sample location associated with the coverage bit is covered by one of the polygons;
storing, in a buffer, a resultant value of the coverage bit after the plurality of polygons are successively superimposed, the resultant value operable for use in subsequent rendering of the surface; and
determining, using a shader, a color of the pixel using the resultant value of the coverage bit, wherein the shader is disabled in response to the rasterizer performing the changing operation and is enabled in response to the storing of the coverage bit.

2. The method of claim 1 wherein the changing comprises:
reading a first value for the coverage bit from the buffer, wherein the first value is associated with the sample location;
determining whether the sample location is covered by a polygon of the plurality of polygons, wherein a second value associated with the sample location is set depending on coverage of the sample location by the polygon;
combining the first value with the second value to produce a third value; and
writing the third value to the buffer in place of the first value.

3. The method of claim 2 wherein the combining comprises using the first and second values as operands in a logical operation, wherein the logical operation is selected from the group consisting of: an XOR operation, a NOR operation, and an OR operation.

4. The method of claim 1 wherein the pixel comprises a plurality of sample locations and wherein each of the sample locations is associated with a respective coverage bit, wherein the method further comprises:

accessing resultant values for coverage bits associated with the pixel after the plurality of polygons are successively superimposed;
using the resultant values to determine a fraction of the pixel covered by the surface;
reading a destination color and a source color associated with the pixel; and
determining the color of the pixel using the destination color, the source color and the fraction.

5. The method of claim 1 wherein the pixel comprises five sample locations.

6. The method of claim 1 wherein the polygons are triangles.

7. A system comprising:
a rasterizer operable to successively superimpose a plurality of polygons onto a surface comprising a plurality of pixels, wherein each of the polygons has a vertex that coincides with a same reference point; and
a shader coupled to the rasterizer;
wherein the rasterizer is further operable to determine coverage information for the plurality of pixels by i) generating a first bit sequence that represents a number of sample locations that are covered by a first polygon of the plurality of polygons, ii) reading feed a second bit sequence from a buffer, iii) combining the first bit sequence with the second bit sequence using a logical operation to produce a third bit sequence, and iv) writing the third bit sequence back to the buffer; and wherein the shader is operable for determining a color of a pixel based on the coverage information in the buffer; and
wherein the shader is disabled while the rasterizer is determining the coverage information for the plurality of pixels, and wherein the shader is subsequently enabled after the rasterizer determines the coverage information for the plurality of pixels.

8. The system of claim 7 wherein the boundary of the surface is represented as a plurality of straight line segments and wherein each of the polygons has an edge that coincides with one of the line segments.

9. The system of claim 7 wherein the logical operation is selected from the group consisting of: an XOR operation, a NOR operation, and an OR operation.

10. The system of claim 7 wherein the shader uses the values in the buffer to determine a fraction of the pixel that is overlapped by the surface.

11. The system of claim 10 wherein the fraction is used to weight a destination color and a source color that are associated with the pixel in order to determine the color of the pixel.

12. The system of claim 7 wherein the rasterizer processes four pixels comprising 20 sample locations per clock cycle.

13. The system of claim 7 wherein the pixel comprises five sample locations, wherein the first, second and third bit sequences each comprise a bit per sample location.

14. The system of claim 7 wherein the polygons are triangles.

15. A method comprising:
representing a surface as a plurality of straight line segments;
successively superimposing a plurality of polygons onto the surface, wherein each of the polygons has a vertex that coincides with a same reference point and wherein each of the polygons has an edge that coincides with one of the line segments;
receiving, in a buffer in a computer system, coverage information for a bounding box of pixels, the coverage information comprising a plurality of bits per pixel, the coverage information operable for identifying a subset of the pixels that are covered at least partially by the surface;

changing a respective bit value in the coverage information each time a corresponding sample location included within one of the pixels in the bounding box is covered by one of the polygons;

determining, using a shader that is executed by the computer system, fractions of the pixels in the subset that are covered by the surface using the coverage information; and determining, using the shader, colors of the pixels in the subset using the fractions, wherein the shader is disabled while the coverage information for the bounding box of pixels is generated, and wherein the shader is enabled after the coverage information is determined for the bounding box of pixels.

16. The method of claim 15 further comprising using the fractions to weight destination colors and source colors that are associated with the pixels in the subset in order to determine the colors of the pixels in the subset.

17. The method of claim 15 further comprising reading a first bit value from memory, the bit value associated with a sample location within one of the pixels in the bounding box;

setting a second bit value according to whether or not the sample location is covered by one of the polygons:

producing a third bit value by combining the first and second bit values using a logical operation; and writing the third bit value to the memory in place of the first bit value.

* * * * *